Patented Apr. 25, 1939

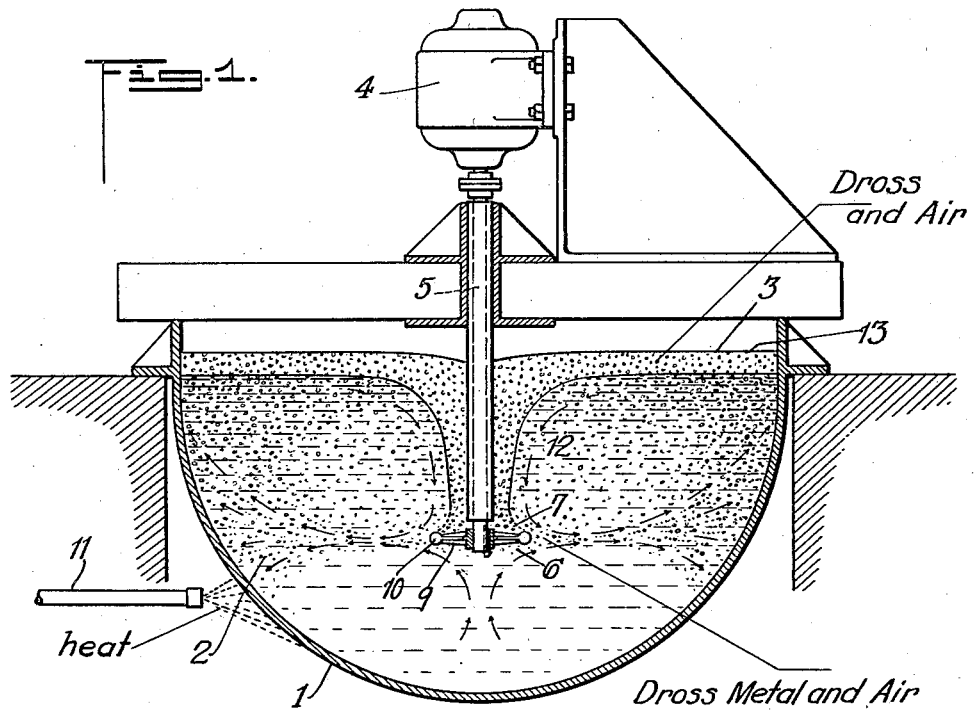
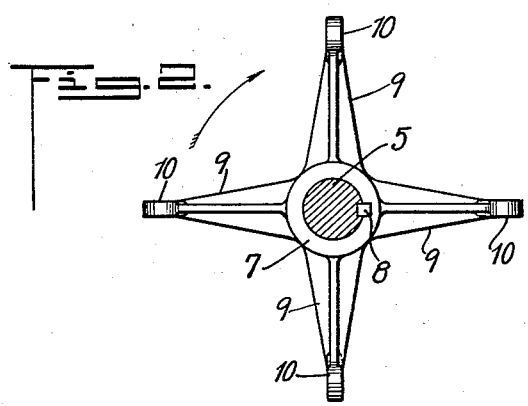
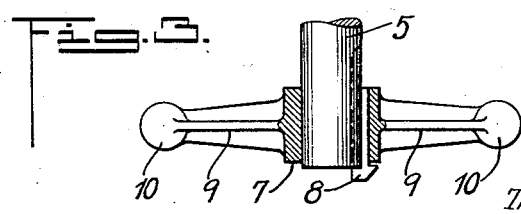

2,155,545

UNITED STATES PATENT OFFICE 2,155,545

REMOVAL OF TIN FROM LEAD CONTAINING TIN AND OTHER IMPURITIES

Thomas E. Harper, Jr., and Gustave Reinberg, La Oroya, Peru, assignors, by mesne assignments, to The American Metal Company, Limited, New York, N. Y., a corporation of New York Application March 23, 1938, Serial No. 197,672. In Peru July 13, 1935

6 Claims. (Cl. 75—78)

This invention relates to separating tin from impure lead which contains tin and perhaps other components, and particularly to such separation by oxidation.

Separation from lead of relatively small quantities of tin, arsenic, antimony, copper, etc., has been made by the method known as softening as described in "Metallurgy of Lead" by H. O. Hoffman, 1918. This process is based on the preferential affinity of these metals other than copper for oxygen. Thus tin oxidizes first, then arsenic, antimony and then lead. For such softening the lead bullion is melted at low temperature to separate the copper as a dross. After separation of the copper the temperatures are raised and the other metals are allowed to oxidize which they appear to do in the order indicated above. There always occurs in the softening furnace an excessive oxidation of lead which escapes as oxide with the oxides of the other metals from which it is desired to separate it. According to Hoffman's book mentioned above the tin skim that rises to the surface in the softening furnace after the dross has been removed contains about 70% lead-oxide and about 12.5% of tin-oxide, which means a metallic tin content of about 9.5%.

Another method has been proposed for separation of tin from lead and other alloys by air oxidation with stirring. The tin-oxide forms a dross which rises to the surface from which it is removed. The process is stated to produce drosses containing as high as 12% tin. With low antimonial lead the content is considerably less.

Summarizing these old processes then the softening process produced some concentration of tin but at the same time caused the production of a very high percentage of lead-oxide which depleted to that extent the amount of metallic lead in the resulting metal recovered. The stirring process resulted in a dross whose highest content of tin is stated to be 12%.

We have found in accordance with our invention that the concentration of tin in the dross may be increased above 12% and under preferred working conditions may run as high as 45% of tin in the dross This is accomplished by stirring the molten bath of impure lead containing tin and other impurities such as antimony, arsenic, etc. if these are present, under temperature conditions, and stirring speeds such that lead-oxide is produced in appreciable quantities and causes replacement reactions with tin to form tin-oxide and metallic lead. Thus in accordance with our invention under the temperature and stirring conditions mentioned two types of oxidation principally are occurring, namely (1) a direct oxidation of tin and lead, arsenic, antimony, etc. by air stirred into the bath, and (2) an oxidation of the tin by lead-oxide and other oxides, (such oxides being continuously formed by direct oxidation of the air). As a result the dross which we obtain according to our invention contains the higher percentages of tin mentioned. It also contains some lead-oxide but the actual quantities of lead-oxide formed are small since the percentage of dross formed as compared with the amount of metal treated is small.

The principal object of the present invention accordingly is to provide a simple process for separation of tin from impure lead which shall result in a higher concentration of tin in the resulting dross, and which may be performed by a simple inexpensive apparatus.

The invention accordingly comprises the novel processes and steps of processes as well as the novel apparatus and combinations thereof for carrying out such processes, specific embodiments of which are described herein by way of example only and in accordance with the manner in which we now prefer to practice the invention.

An apparatus in which the process may be carried out is shown in the accompanying drawing constituting part of this specification, in which:

Fig. 1 is a vertical section shown in part diagrammatically of a kettle with a stirrer mounted thereon;

Fig. 2 is an enlarged detailed view of the impeller of Fig. 1; and

Fig. 3 is an enlarged fragmentary view of the impeller shown in Fig. 1.

In the drawing, numeral 1 indicates a hemispherical steel kettle in which is contained a bath 2 of molten lead containing tin, and which may also contain other impurities such as antimony, arsenic, etc. Mounted above the bath on suitable supports 3 is a high speed electric motor 4. This motor operates a vertical shaft 5 which depends therefrom and at the ends of which is mounted a disintegrating impeller 6. The impeller is situated preferably at about half the depth of the bath 2. The motor 4 is capable of rotating the shaft and impeller at speeds of 900 R. P. M. or higher, giving a peripheral speed of the impeller of over about 2600 ft. per minute. The impeller 6 is composed of a sleeve 7 keyed to the shaft 5 by key 8. From the collar and integral therewith extend four disintegrating radial arms 9 of generally elongated pyramidal shape in plan view. Each outer free end of each arm terminates in two flat disc-like faces 10 providing a leading flat face when the impeller is rotated.

A burner 11 passes into the housing at the base of the kettle and is used for initially heating the contents and maintaining the heat of the kettle when required. When the motor 4 is operating at high speed it causes the impeller 6 to form a vortex 12 in the molten metal of the bath 2. Oxidation of the tin and lead occurs and a dross 13 collects on the surface of the metal and is drawn into the vortex and from there thrown out laterally by the impeller, so that the particles of dross are disseminated through the bath as shown by the fine dots in the bath 2 in Fig. 1. This dross consists of oxides of tin and lead and other oxide impurities of metals that may be present.

In carrying out our process primary or direct oxidation by air of the impure lead containing tin, and other components produces a substantial amount of lead-oxide and may produce oxides of the other components. The lead-oxide and tin-oxide form a dross which is continuously circulated through the bath 2 as noted. As a result of the direct oxidation of tin and the circulation of the dross containing lead-oxide through the bath, a building up of the tin-oxide content of the dross occurs. We have found that using speeds of above about 900 R. P. M. with the apparatus shown in the drawing, and with maintenance of a temperature of above 950° F. but below the complete fusing temperature of the dross, that drosses may be produced that contain over 12% tin.

At satisfactory stirring speeds a vortex is produced which is filled quickly with dross approximating that shown in Fig. 1 of the drawing. With such vortex about the impeller 6 the dross containing lead-oxide can descend to the impeller and be disintegrated and thrown out and scattered through the molten bath so that the lead-oxide will combine with tin to produce tin-oxide. At the same time air associated with the dross in the vortex will also be thrown out into the molten bath, and any unreacted will escape through the surface of the molten metal and the dross resting thereon. The drosses containing tin-oxide and lead-oxide are present as very finely divided powdered material, and it is accordingly important that intimate contact be established between these fine particles and the molten bath. By throwing the particles outward from the impeller at high speed they travel through a large part of the bath, and thus have a chance to react with whatever tin the bath contains.

The process of the invention operates satisfactorily with lead and tin alloys containing small or large amounts of other metals such as for example, antimony, arsenic and silver. It has been found that when treating lead containing tin and large amounts of antimony and arsenic that the elimination of tin is slightly faster than where these elements are not present. This may be due to the fact that antimony-oxide and arsenic-oxide, which are formed by the primary oxidation, act similarly to lead-oxide, and that the reaction of all three oxides simultaneously with the tin causes a more rapid reaction.

The following examples represent preferred embodiments of the invention. It is to be understood that these examples are purely illustrative and the invention is not to be limited thereby except as indicated in the appended claims.

*Example 1*

The kettle 1, which is open to the air, is charged with approximately 75,000 pounds of molten metal assaying:

| | | |
|---|---|---|
| Tin | percent | 1.05 |
| Antimony | do | 5.83 |
| Arsenic | do | .22 |
| Ounces of silver | per ton | 123 |
| Lead | | Balance |

After charging the kettle the oil burner is used to bring the temperature of the kettle up to 1000–1100° F. The mixer or stirrer is placed in a manner such that the impeller is in the exact center of the kettle. Thereupon the stirring apparatus is securely fastened to prevent movement. The mixer is started and maintained at a speed of 1200–1500 R. P. M. giving at least about 3450 ft. per minute peripheral speed, using an 11 inch impeller. At this speed a vortex is formed whose walls are very steep and almost parallel to the shaft 5. If necessary a small amount of heat is supplied to maintain the initial temperature. As the stirring and heating continue, primary oxidation by the air starts, whereby tin-oxide, lead-oxide, antimony-oxide and arsenic-oxide are formed. The silver remains substantially unoxidized. The lead and other oxides then react with tin in the bath to form tin-oxide by replacement reactions liberating lead as the metal to the bath. These replacement reactions are exothermic and the temperature of the bath rises. The heat from the burner 11 is cut off or regulated so that the temperature of the bath is maintained at about 1130° F. It is important to observe the temperature closely as it rises rapidly when the reactions occur in the kettle and when heat is being supplied from the oil burner at the same time. The rise is so rapid that in a few minutes the charge may be so hot as to endanger the kettle where it is made of cast iron or steel. If shutting off the oil burner fails to control the heat, it may be further controlled by slowing down the mixer. As the formation of tin-oxide proceeds by direct and replacement oxidation, heat continues to be given off by the reaction involved. With the charge specified in this example, a light fire from the oil burner is required for about 10 minutes for every 2 hours in order to hold the temperature within the limits desired. The stirring is continued until the desired concentration of tin in the dross and removal of tin from the metal is secured. The length of time required is dependent upon the temperature, the amount of dross present, the tin content of the dross and metal and the intensity of mixing or thoroughness of contact between dross particles and the metallic bath. The size of the dross particles is also important. The time required and the various conditions of operation are also dependent on the type and size of the impeller.

As the reaction proceeds the dross layer becomes thicker and should be removed from time to time. The rate of oxidation shown for the metal employed in this example is as follows:

| Hours stirring | Percent Sn in metal | Percent Sn in dross |
|---|---|---|
| 0 | 1.05 | |
| 1 | 1.02 | 10.91 |
| 2 | 0.86 | 19.84 |
| 3 | 0.74 | 29.26 |
| 4 | 0.68 | 29.76 |
| 5 | 0.56 | 34.60 |

At the end of the 5 hour period, 1250 pounds of dross had been skimmed which analyzed as follows:

| | | |
|---|---|---|
| Tin | per cent | 34.60 |
| Antimony | do | 3.78 |
| Arsenic | do | .08 |
| Lead | do | 49.6 |
| Silver | ounces | 37 |

The metal remaining in the bath analyzed as follows:

| | | |
|---|---|---|
| Tin | per cent | .56 |
| Antimony | do | 5.72 |
| Arsenic | do | .21 |
| Silver | ounces | 126 |
| Lead | | Balance |

Example 2

77,000 pounds of metal analyzing:

| | | |
|---|---|---|
| Tin | per cent | .74 |
| Antimony | do | 6.26 |
| Arsenic | do | .33 |
| Silver per ton | ounces | 120 |
| Lead | | Balance | was placed in the kettle and stirring commenced, the operation being conducted under similar conditions as those given in Example 1. The metal was treated at stirring speeds of about 1200–1500 R. P. M. with an 11 inch impeller at temperatures varying between 1060–1160° F. for 4 hours. The tin assay of the metal and percentage of tin in the dross is shown in the following tabulation:

| Hours stirring | Percent Sn in metal | Percent Sn in dross |
|---|---|---|
| 0 | 0.74 | |
| 1 | 0.47 | 19.20 |
| 2 | 0.37 | 25.29 |
| 3 | 0.12 | 31.37 |
| 4 | 0.06 | 32.36 |

The dross removed weighed 1956 pounds and assayed as follows:

| | | |
|---|---|---|
| Tin | per cent | 32.36 |
| Antimony | do | 5.84 |
| Arsenic | do | .12 |
| Lead | do | 52.2 |
| Silver per ton | ounces | 35 | and the metal analyzed:

| | | |
|---|---|---|
| Tin | per cent | .06 |
| Antimony | do | 6.39 |
| Arsenic | do | .33 |
| Silver per ton | ounces | 118 |
| Lead | | Balance |

Example 3

The following is an example showing the production of a somewhat higher content of tin in the final dross. The starting metal contains a somewhat higher percentage of antimony than given in the two preceding examples. The kettle is charged with approximately 71,000 pounds of molten metal assaying:

| | | |
|---|---|---|
| Tin | per cent | 1.46 |
| Antimony | do | 14.88 |
| Arsenic | do | 1.08 |
| Silver per ton | ounces | 5.20 |
| Lead | | Balance |

Stirring was commenced and the operations were conducted under similar conditions as those given in Example 1. The metal was treated at stirring speeds of about 1200–1400 R. P. M. with an 11 inch impeller at temperatures varying between 1070–1140° F. for four hours. The tin assays of the metal and the percentage of tin in the dross is shown in the following tabulation:

| Hours stirring | Percent Sn in metal | Percent Sn in dross |
|---|---|---|
| 0 | 1.46 | |
| 1 | 1.22 | 30.74 |
| 2 | .85 | 35.14 |
| 3 | .71 | 41.72 |
| 4 | .24 | 43.68 |

The dross removed weighed 2276 pounds and assayed as follows:

| | | |
|---|---|---|
| Tin | per cent | 43.68 |
| Antimony | do | 6.10 |
| Arsenic | do | .53 |
| Silver per ton | ounce | .50 |
| Lead | per cent | 33.80 |

The metal analyzed:

| | | |
|---|---|---|
| Tin | per cent | .24 |
| Antimony | do | 15.07 |
| Arsenic | do | 1.08 |
| Silver per ton | ounces | 4.80 |

Example 4

The following is an example showing the production of a trace of tin in the final metal. The kettle is charged with approximately 75,000 pounds of molten metal assaying:

| | | |
|---|---|---|
| Tin | per cent | 1.07 |
| Antimony | do | 6.32 |
| Arsenic | do | .26 |
| Silver per ton | ounces | 118.4 |
| Lead | | Balance |

Stirring was commenced and the operations were conducted under similar conditions as those given in Example 1. The metal was treated at stirring speeds of about 1320–1500 R. P. M. with an 11 inch impeller at temperatures varying from 1100–1160° F. The tin assays of the metal and the percentage of tin in the dross is shown in the following tabulation:

| Hours stirring | Percent Sn in metal | Percent Sn in dross |
|---|---|---|
| 0 | 1.07 | |
| 1 | 1.01 | 24.06 |
| 2 | .95 | 36.66 |
| 3 | .85 | 36.54 |
| 4 | .69 | 39.31 |
| 5 | .50 | 37.80 |
| 6 | .39 | 34.02 |
| 7 | .32 | 29.61 |
| 8 | Trace | 32.76 |

The dross removed weighed 2680 pounds and assayed as follows:

| | | |
|---|---|---|
| Tin | per cent | 32.76 |
| Antimony | do | 4.02 |
| Arsenic | | Trace |
| Silver per ton | ounces | 35.0 |
| Lead | per cent | 47.6 |

The metal analyzed:

| | | |
|---|---|---|
| Tin | | Trace |
| Antimony | per cent | 6.46 |
| Arsenic | do | .26 |
| Silver per ton | ounces | 120.0 |
| Lead | | Balance |

In the above examples, only one removal of the dross layer was made and that removal occurred at the end of the operation. Normally, a 2–4 inch dross layer is sufficient to produce the desired tin content in the dross and if the dross layer becomes thicker than 4 inches, it is preferable to remove it.

The metal obtained as a result of the above examples may be employed as desired. The dross may be smelted or otherwise treated to recover the metal constituents.

The tin in the above examples can be reduced to .005% or less by continuing the operation.

The replacement reactions occurring in accordance with the above examples probably include the following:

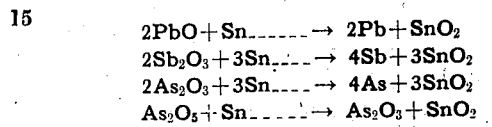

$$2PbO + Sn \rightarrow 2Pb + SnO_2$$
$$2Sb_2O_3 + 3Sn \rightarrow 4Sb + 3SnO_2$$
$$2As_2O_3 + 3Sn \rightarrow 4As + 3SnO_2$$
$$As_2O_5 + Sn \rightarrow As_2O_3 + SnO_2$$

Other reactions and more complicated combinations of the above may also be taking place.

The color changes in the dross are indications as to the progress of the operation. At first the oxide formed will be yellow, but this changes to gray as the oxidation proceeds. The initial yellow dross contains little tin, while the light gray dross contains well over 30% tin. If the process is continued, the color changes back through gray to a superficial yellow and the return of the yellow coloration appears to be a litharge skim on the individual dross particles. This occurs when the tin concentration of the lead is very low and consequently the litharge or lead-oxide formation is more rapid than tin-oxide formation.

During the early stages of operation, the dross appears to be formed at approximately a rate of 600–700 pounds per hour, using metal charges of the size mentioned and conditions as given in the above examples. As the operation continues, the rate of dross formation slows down to about 300 pounds per hour which occurs after 2 or 3 hours of operation. Tin elimination by selective oxidation plus replacement reactions seems to be very close to 150 pounds of tin per hour, where lead-oxide ordinarily forms at the rate of 300 pounds per hour.

In the claims the expression "lead-oxide" is intended to refer to litharge PbO, either alone or in combination with one or more other oxides such as for example antimony or arsenic-oxide.

We claim:

1. A process for separating tin from impure lead which comprises stirring a mass containing lead oxide and air into a molten bath of such lead at a temperature above about 950° F. with a disintegrating impeller immersed in the bath, at a speed of at least about 900 R. P. M. to form a vortex extending to the impeller, thereby causing a stream containing said lead oxide and some air to pass into the vortex and into contact with the impeller, the latter being of a character including shape and size to disintegrate the stream containing lead oxide at the speed mentioned, projecting the disintegrated stream by the impeller into the metal bath and mixing it therewith.

2. A process for separating tin from impure lead which comprises stirring a mass containing lead oxide and air into a molten bath of such lead at a temperature above about 950° F. with an immersed impeller having disintegrating arms at a speed of at least about 900 R. P. M. to form a vortex extending to the impeller, thereby causing a stream containing lead oxide and some air to pass into the vortex and into contact with the impeller, the latter being of a character including shape and size to disintegrate the stream containing lead oxide at the speed mentioned, projecting the disintegrated stream by the impeller into the metal bath and mixing it therewith.

3. A process for separating tin from impure lead which comprises stirring a molten bath of such lead at above 950° F. with a disintegrating immersed impeller at a speed of at least about 900 R. P. M. to form a vortex extending to the impeller to oxidize the bath and form a dross containing tin oxide and appreciable amounts of lead oxide, thereby causing a stream of said oxides and some air to pass into the vortex and into contact with the impeller, the latter being of a character to disintegrate the stream of oxides at the speed mentioned, projecting the disintegrated stream by the impeller into the metal bath and mixing it therewith.

4. A process according to claim 3 in which the temperature is maintained within the range of approximately 1000 to 1200° F.

5. A process for separating tin from impure lead which comprises stirring a molten bath of such lead containing tin at a temperature of above about 950° F. with an immersed impeller comprising radial projections operated at a speed of about 900 to 1800 R. P. M. to form a vortex extending to the impeller, causing the dross formed to pass the vortex with some air into contact with the impeller, the latter being of a suitable size to disintegrate the stream of dross at the speed mentioned, projecting the disintegrated stream by the impeller into the metal bath and mixing therewith.

6. A process for separating tin from impure lead which comprises stirring a molten bath of such lead at above 950° F. with a disintegrating impeller at a speed of at least about 900 R. P. M. to form a vortex extending to the impeller to oxidize the bath and form a dross containing tin oxide and appreciable amounts of lead oxide, thereby causing a stream of said oxides and some air to pass into the vortex and into contact with the impeller, the latter having a series of projecting radial arms, each provided with a flat face forming the leading face when the impeller is rotated, projecting the disintegrated stream by the impeller into the metal bath and mixing it therewith to produce a dross containing at least 25% tin.

THOMAS E. HARPER, JR.
GUSTAVE REINBERG.